United States Patent
Lee

(10) Patent No.: US 9,481,232 B2
(45) Date of Patent: Nov. 1, 2016

(54) FOLDABLE SUN VISOR FOR SCOOTER

(71) Applicant: Chun Bok Lee, Cheongju-si (KR)

(72) Inventor: Chun Bok Lee, Cheongju-si (KR)

(73) Assignee: Chun Bok Lee, Cheongju-si, Chungcheongbuk-do (KR)

( * ) Notice: Subject to any disclaimer, the term of this patent is extended or adjusted under 35 U.S.C. 154(b) by 0 days.

(21) Appl. No.: 14/730,315

(22) Filed: Jun. 4, 2015

(65) Prior Publication Data

US 2015/0352938 A1     Dec. 10, 2015

(30) Foreign Application Priority Data

Jun. 5, 2014    (KR) .................. 10-2014-0068478

(51) Int. Cl.
| | |
|---|---|
| *B60J 7/16* | (2006.01) |
| *A47C 7/66* | (2006.01) |
| *B60J 3/00* | (2006.01) |
| *B60J 3/02* | (2006.01) |
| *B60J 5/04* | (2006.01) |

(52) U.S. Cl.
  CPC ............... *B60J 7/1657* (2013.01); *A47C 7/66* (2013.01); *B60J 3/002* (2013.01); *B60J 3/02* (2013.01); *B60J 5/0487* (2013.01)

(58) Field of Classification Search
  CPC .......... A01K 97/01; A47C 7/66; A61G 5/04; B60J 5/0487; B60J 7/16; B60J 7/1628; B60J 7/1635; B60J 7/1657; B60N 2/46; B60N 2/4606; B60N 2/466; B60N 2/468; B62K 5/003; B62K 5/007; B62K 5/01; B62K 27/16
  See application file for complete search history.

(56) References Cited

U.S. PATENT DOCUMENTS

| | | | | |
|---|---|---|---|---|
| 916,439 | A * | 3/1909 | Grover .................. | B60J 5/0487 135/88.02 |
| 1,080,628 | A * | 12/1913 | Grissim .................. | A47C 7/66 135/143 |
| 3,729,225 | A * | 4/1973 | Savage .................. | A47C 7/66 160/265 |
| 3,879,086 | A * | 4/1975 | Moceri .................. | A47C 7/66 135/16 |
| 4,131,312 | A * | 12/1978 | Price ....................... | A47C 7/66 297/184.11 |
| 4,579,191 | A * | 4/1986 | Klee ...................... | B60J 5/0487 180/268 |
| 4,632,448 | A * | 12/1986 | Yagasaki .................. | B60J 7/08 296/102 |

(Continued)

FOREIGN PATENT DOCUMENTS

| | | | | | |
|---|---|---|---|---|---|
| DE | | 1216129 B | * | 5/1966 | ............ B60J 5/0487 |
| DE | | 1949303 A1 | * | 4/1971 | ............... B60N 2/46 |

(Continued)

*Primary Examiner* — Dennis H Pedder
*Assistant Examiner* — Paul Chenevert
(74) *Attorney, Agent, or Firm* — Paratus Law Group, PLLC

(57) ABSTRACT

A folding type awning board for electrically driven scooter, including: a frame fixed to the electrically driven scooter in which both side armrests are folded; and an awning screen installed at least one of the front, rear, left, right sides and a ceiling of the frame. The frame includes a ceiling frame; a seat fixing section which is hinge combined to the ceiling frame; and first and second armrest fixing rods, the upper end portions of which are hinge connected to said ceiling frame at a portion of said ceiling frame in the front of said seat fixing section, and the lower end portions of which are connected to the armrests of the electrically driven scooter. First and second armrest fixing rods and the ceiling frame are folded together so as to be erected or laid down when the armrests are folded.

8 Claims, 9 Drawing Sheets

(56) References Cited

U.S. PATENT DOCUMENTS

| | | | | |
|---|---|---|---|---|
| 4,639,036 A * | 1/1987 | Nichols | A47C 7/62 | 248/230.2 |
| 4,763,946 A * | 8/1988 | Robbins | B60N 2/46 | 296/97.1 |
| 4,788,997 A * | 12/1988 | Clopton | E04H 15/001 | 135/117 |
| 5,168,889 A * | 12/1992 | Diestel | A47C 7/66 | 135/161 |
| 5,203,363 A * | 4/1993 | Kidwell | A47C 7/66 | 135/90 |
| 5,240,020 A * | 8/1993 | Byers | A47C 7/66 | 135/155 |
| 5,788,317 A * | 8/1998 | Nation | B60J 5/0487 | 150/166 |
| 5,842,732 A * | 12/1998 | Daggett | B60J 7/1657 | 135/88.01 |
| 5,873,625 A * | 2/1999 | Uchtman | A47C 7/66 | 297/184.15 |
| 5,938,237 A * | 8/1999 | Abels | B60J 5/0487 | 180/282 |
| 7,140,678 B1 * | 11/2006 | Grant | A47C 7/66 | 135/143 |
| 7,429,075 B2 * | 9/2008 | Turnbull | B60J 5/0487 | 180/89.12 |
| 7,431,388 B2 * | 10/2008 | Sharapov | A47C 1/14 | 297/184.11 |
| 7,740,300 B2 * | 6/2010 | Marsh | B60J 5/0487 | 296/77.1 |
| 8,312,911 B2 * | 11/2012 | Haagenson | B60J 5/0487 | 160/330 |
| 9,004,574 B1 * | 4/2015 | Fisher | B60J 5/0487 | 296/138 |
| 2003/0146654 A1 * | 8/2003 | Nguyen | B64D 11/06 | 297/463.2 |
| 2007/0018486 A1 * | 1/2007 | Ayers | A47C 7/66 | 297/184.15 |
| 2008/0185028 A1 * | 8/2008 | Ayers | A61G 5/10 | 135/88.13 |
| 2011/0175407 A1 * | 7/2011 | Sharapov | A47C 7/66 | 297/184.15 |
| 2011/0181078 A1 * | 7/2011 | Kelly | A47C 7/66 | 297/16.1 |
| 2012/0192905 A1 * | 8/2012 | Boss | A61G 5/10 | 135/88.03 |
| 2013/0186697 A1 * | 7/2013 | Schneider | B60L 8/003 | 180/2.2 |
| 2015/0137557 A1 * | 5/2015 | Thomas | B62J 17/08 | 296/190.09 |
| 2015/0296990 A1 * | 10/2015 | Malik | A61G 5/10 | 280/47.38 |
| 2016/0058638 A1 * | 3/2016 | Davis | A61G 5/10 | 297/184.12 |

FOREIGN PATENT DOCUMENTS

| | | | | |
|---|---|---|---|---|
| DE | 2918391 A1 * | 11/1980 | | A47C 7/66 |
| DE | 19932256 A1 * | 1/2001 | | B60J 5/0487 |
| GB | 209586 A * | 1/1924 | | A47C 4/40 |
| JP | 07016261 A * | 1/1995 | | A61G 5/02 |
| JP | 2788428 B2 * | 8/1998 | | B60J 5/0487 |
| JP | 2003135530 A * | 5/2003 | | A61G 5/00 |
| KR | 20090090703 A * | 8/2009 | | A61G 5/04 |
| KR | 10-2013-0012341 A | 2/2013 | | |
| KR | 20-0471837 Y1 | 3/2014 | | |
| KR | 20140085213 A * | 7/2014 | | A45B 11/00 |

\* cited by examiner

FOLDABLE SUN VISOR FOR SCOOTER

CROSS REFERENCE TO PRIOR APPLICATION

This application claims priority to Korean Patent Application No 10-2014-0068478 (filed on Jun. 5, 2014), which is hereby incorporated by reference in its entirety.

TECHNICAL FIELD

The present disclosure relates to a folding type awning board for electrically driven scooter, and more particularly, it relates to a folding type awning board for electrically driven scooter which makes user easily and conveniently get on and off the electrically driven scooter by making it possible to freely erect and lay down a folding type armrest applied to the electrically driven scooter as a basic specification and which can protect the user from the rain and the snow.

BACKGROUND ART

In general, since for the movement discomfort people, the old and the weak, and the handicapped it is inconvenient or impossible to walk for oneself, they rely on an electrically driven scooter or a wheelchair for easy movement. In addition, the electrically driven scooter is used at the golf course or the like to be able to move along the green. The present invention is applicable to the electrically driven scooter, the wheelchair, and the like, and in particular, is effectively applied to the specification where a armrest is folded, and accordingly hereinafter the electrically driven scooter will be taken as an example for explanation.

The electrically driven scooter is mainly used in the outdoor movement, and the users have experienced a lot of inconveniences from the strong direct ray, the rain and the like in the daytime when the direct ray is strong or in the rainy day.

To remove such inconveniences, there has been suggested an awning board which is mounted on the electrically driven scooter for interrupting the direct ray, the rain and the snow.

The conventional awning board can achieve the purpose of interruption of the sun ray and the like by being mounted on the electrically driven scooter, however, there is a problem in that since it did not take the folding of an armrest into consideration, it cannot be applied to the electrically driven scooter provided with the foldable armrest. It is because although in the electrically driven scooter the armrest is constructed in foldable type to make the user easily and conveniently get on and off the electrically driven scooter, when the awning board is mounted, the armrest cannot be folded and laid down. Furthermore, since the conventional awning board is a fixation type, there is an inconvenience that the space between the awning board and the seat is very narrow, so that the user has to bow his body to get on and off.

Of course, the awning board can be used without being fixed to the foldable armrest but only being fixed to the body (seat and the like), however, there is a problem in that in the structure of the electrically driven scooter and the awning board, the awning board cannot be securely mounted so that a severe vibration occurs when the electrically driven scooter moves.

PRIOR ART TECHNICAL DOCUMENTS

Patent Documents (Patent document 0001) Laid open patent 10-2013-0012341
(Patent document 0002) Registered utility 20-0471837

SUMMARY OF THE DISCLOSURE

Problems to be Solved

The present invention has been made in an effort to solve the above-described problems, and the object of the present invention is to provide a folding type awning board for electrically driven scooter which makes user easily and conveniently get on and off the electrically driven scooter by making it possible to freely erect and lay down a folding type armrest applied to the electrically driven scooter as a basic specification and which can protect the user from the rain and the snow.

Solution to the Problems

The folding type awning board for an electrically driven scooter according to the present invention is characterized in that it comprises a frame fixed to said electrically driven scooter in which both side armrests are folded; and an awning screen installed at least one of the front, rear, left, right sides and a ceiling of said frame; wherein said frame comprises a ceiling frame; a seat fixing section which is arranged at the rear side of said ceiling frame toward the lower side, which is hinge combined to said ceiling frame, and which is fixed to said electrically driven scooter; and first and second armrest fixing rods, the upper end portions of which are hinge connected to said ceiling frame at a portion of said ceiling frame in the front of said seat fixing section, and the lower end portion of which are connected to said armrests of said electrically driven scooter, whereby when said armrests of said electrically driven scooter are folded, said first and second armrest fixing rods and said ceiling frame are folded together so as to be erected or laid down.

Effect of the Present Invention

In the folding type awning board for electrically driven scooter according to the present invention, since the awning board is fixed to the armrest and the seat, the awning board is not shaken during the traveling of the electrically driven scooter so as to remove the inconveniences and the discomfort, and when the user gets on and off the electrically driven scooter, in case where the user erect the armrest to secure a wide enough space, the awning board is erected together with the armrest so as not to cause inconveniences at the time of using the electrically driven scooter so that the user conveniently uses the electrically driven scooter, thereby improving the reliability and conveniences of the electrically driven scooter. In addition, when erecting the armrest, the ceiling of the awning board is erected together with the armrest so as to provide a wide space above the seat, so that the user can use the electrically driven scooter without feeling the inconveniences due to the awning board.

Furthermore, since the awning board is rigidly mounted on the electrically driven scooter so as not to be shaken, there are effects of preventing the damage on the awning board and reducing the noise due to the awning board.

BEST MODES FOR CARRYING OUT THE INVENTION

Figure 1:
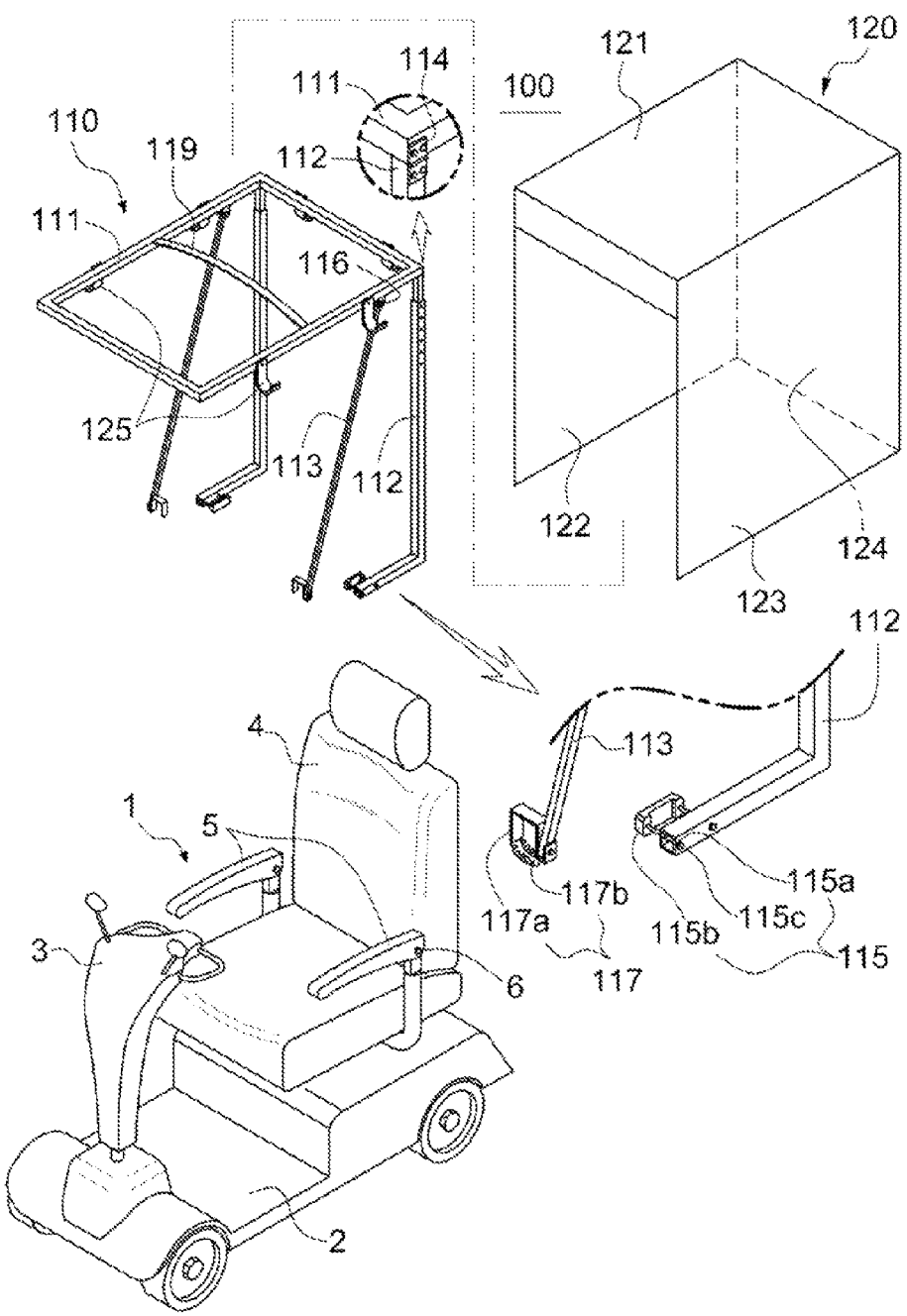
FIG. 1 is a perspective view of a folding type awning board for an electrically driven scooter according to the present invention.
Figure 2:
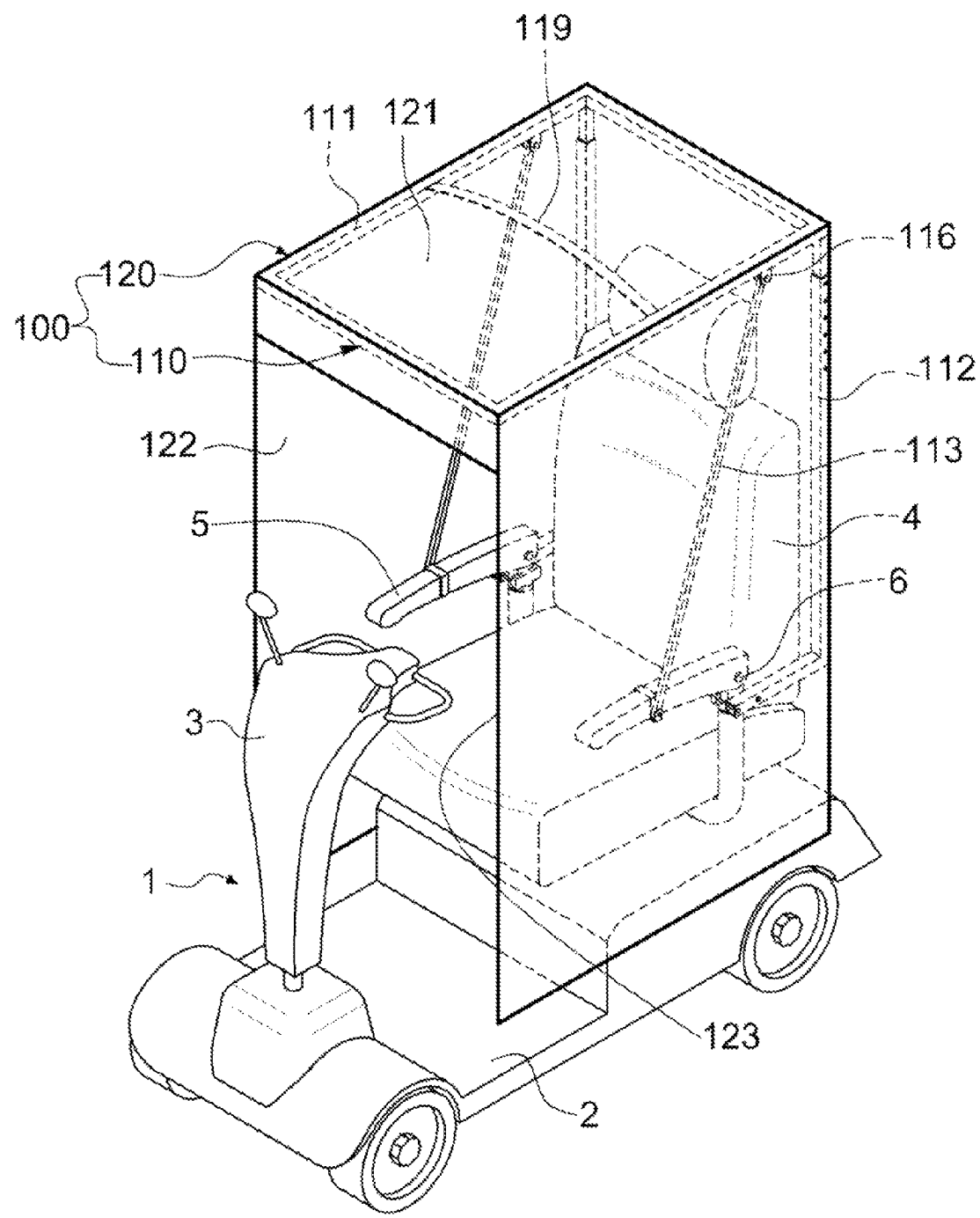
FIG. 2 is a perspective view in which the folding type awning board for the electrically driven scooter according to the present invention is mounted on the electrically driven scooter.
Figure 3:
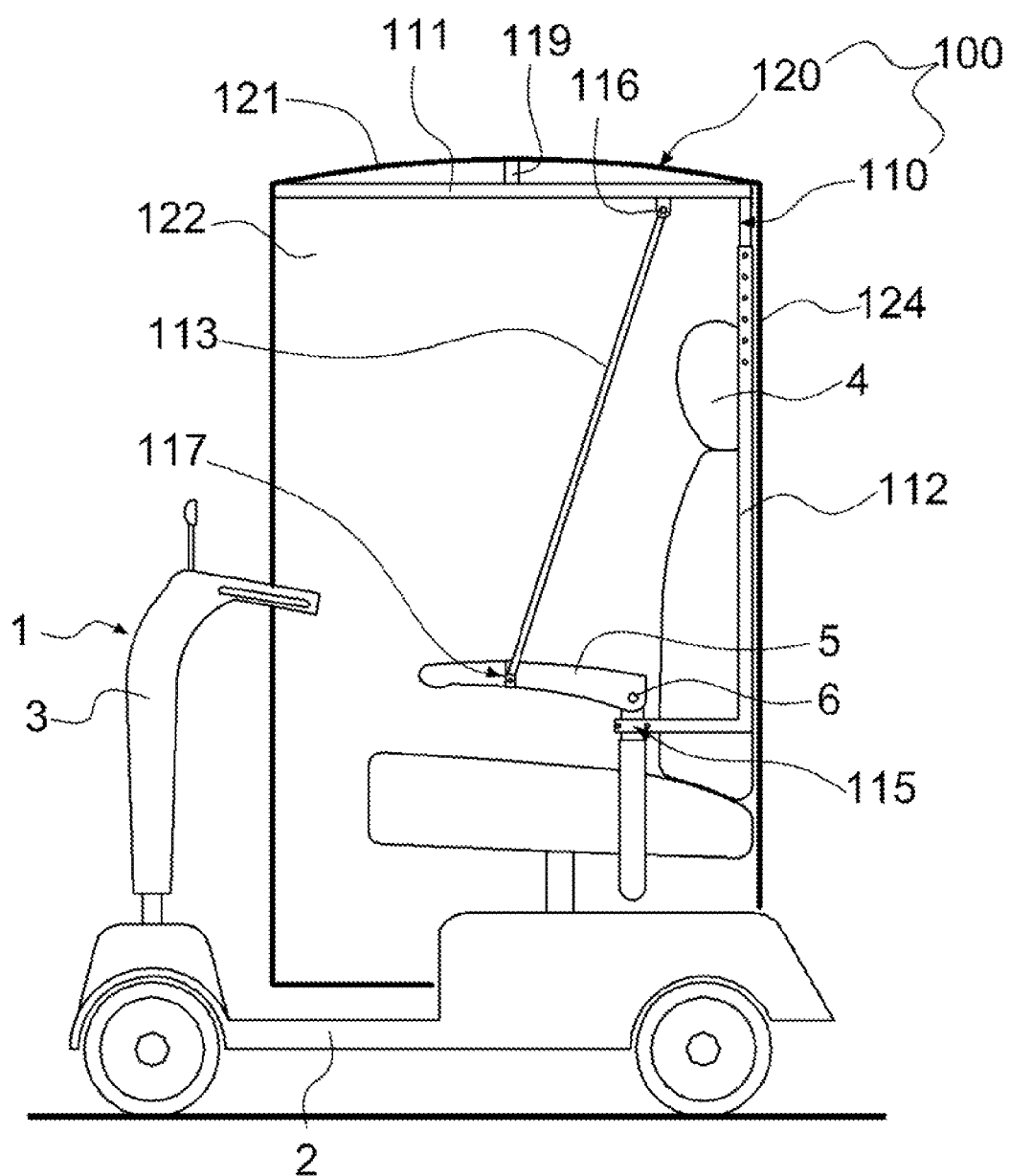
FIG. 3 is a side view in which the folding type awning board for the electrically driven scooter according to the present invention is mounted on the electrically driven scooter.
Figure 4:
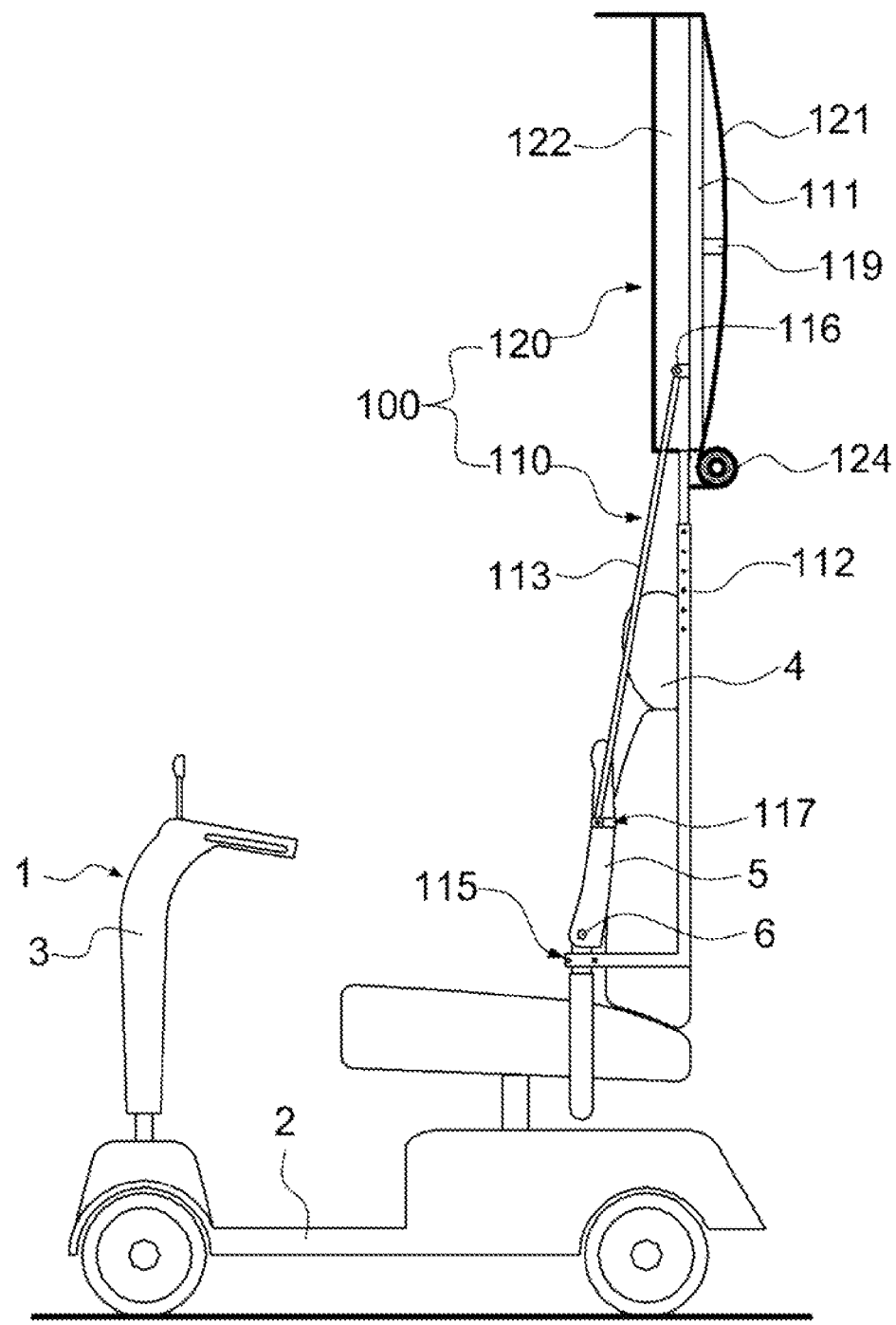
FIG. 4 is a side view showing a condition in which the folding type awning board for the electrically driven scooter according to the present invention is folded by armrests of the electrically driven scooter.

As shown in FIGS. 1 to 3, the folding type awning board 100 for the electrically driven scooter according to the present invention comprises a frame 110 and an awning screen 120, and the electrically driven scooter 1 comprises a body 2 to which wheels are installed, a steering handle 3 for driving, an electrically driving section for generating a power, a seat 4 mounted on the body 2, and armrests 5 each foldably mounted on left and right sides of the seat 4, however, these are already known so that a specific explanation thereof is omitted.

The frame is formed from square pipes and round pipes, and consists of a ceiling frame 111, first and second seat fixing rods 112, and first and second armrest fixing rods 113, wherein in a condition where the first and second seat fixing rods 112 are combined to armrest support rods 6 fixed to the seat 4 and, on the one hand, the first and second armrest fixing rods 113 are fixed to the armrest 5, when a user erects the armrest 5 for getting on and off and lowers the armrest 5 at the time of traveling, the first and second seat fixing rods 112 and the first and second armrest fixing rods 113 are folded and expanded without interfering the use of the armrest 5.

The ceiling frame 111 has as a basis a form of rectangular frame in which four pipes are arranged at front, rear, left and right sides, and reinforcing pipes 119 may be additionally applied in the left-right direction and/or in the front-rear direction.

Upper end portions of the first and second seat fixing rods 112 are rotatably hinge combined to the rear side of the ceiling frame 111 (hinge 114), and lower end portions thereof are separably mounted on the armrest support rods 6 of the electrically driven scooter 1 through seat fixing means 115.

The seat fixing means 115 comprises a first fixing block 115a which is horizontally extended at the lower end portion of the first and second seat fixing rods 112, which is provided with at least one screw holes (in the drawing two holes are shown), and which wraps the outside of the armrest support rods 6, a second fixing block 115b which wraps the inner side of the armrest support rods 6 at the side opposed to the first fixing block 115a, and screw tools 115c (bolt and nut) which are screwed to the first and second fixing blocks 115a, 115b and make the first and second fixing blocks 115a, 115b fixed while wrapping the armrest support rods 6.

The first and second seat fixing rods 112 are only an example of a seat fixing section, and are not limited to being fixed to the armrest support rods 6 but include a structure and the like installed at a variety of places such as back of the seat 4.

Upper end portions of the first and second armrest fixing rods 113 are hinge combined (shaft pins 116) at a certain distance forward from the rear end portion of the ceiling frame 111 to which the first and second seat fixing rods 112 are connected, and lower end portions thereof are separably combined to the armrest 5 through a fixing means 117.

The fixing means 117 is characterized in that it is structured not to use a method of combining by turning the screw tools but to use a method of inserting by using the structure of the armrest 5, and comprises a fixing bracket 117a which has a structure of wrapping the upper portion and the left and right side of the armrest 5 and of being opened toward the bottom or has a flat structure of wrapping the upper portion of the armrest 5, and two coil springs 117b as at least one elastic members which are connected to both ends of the fixing bracket 117a and together with the fixing bracket 117a fix the armrest 5 by elastically wrapping the armrest 5.

When expanding the coil springs 117b, inserting the armrest 5 between the coil springs 117b and the fixing bracket 117a, and moving the fixing means 117 to an installing position of the fixing means 117, then the coil springs 117b by means of their own elastic force push the armrest 5 closely toward the fixing bracket 117a, so that the first and second armrest fixing rods 113 are fixed to the armrest 5.

The armrest 5 of the electrically driven scooter 1 is composed of a pair of left and right armrests, and usually the user erects or folds only one of the armrests 5, and at this time, the first and second armrest fixing rods 113 are preferably connected by means of a connecting rod (not shown) so that the first and second armrest fixing rods 113 fixed to the pair of the armrests 5 are folded together with the armrests 5.

The first and second seat fixing rods 112 and the first and second armrest fixing rods 113 are each composed by expandibly connecting two pipes (structure other than pipe is also possible) composed of sizes different from each other, and therefore, the installation height of the awning board 100 can be freely set to a height suiting the body condition (sitting height) of the user.

The awning screen 120 is divided into a ceiling awning screen 121, left and right awning screens 122, 123, and a rear awning screen 124, so as to screen upper part, left and right parts, and rear part of the head of the user.

Figure 5:
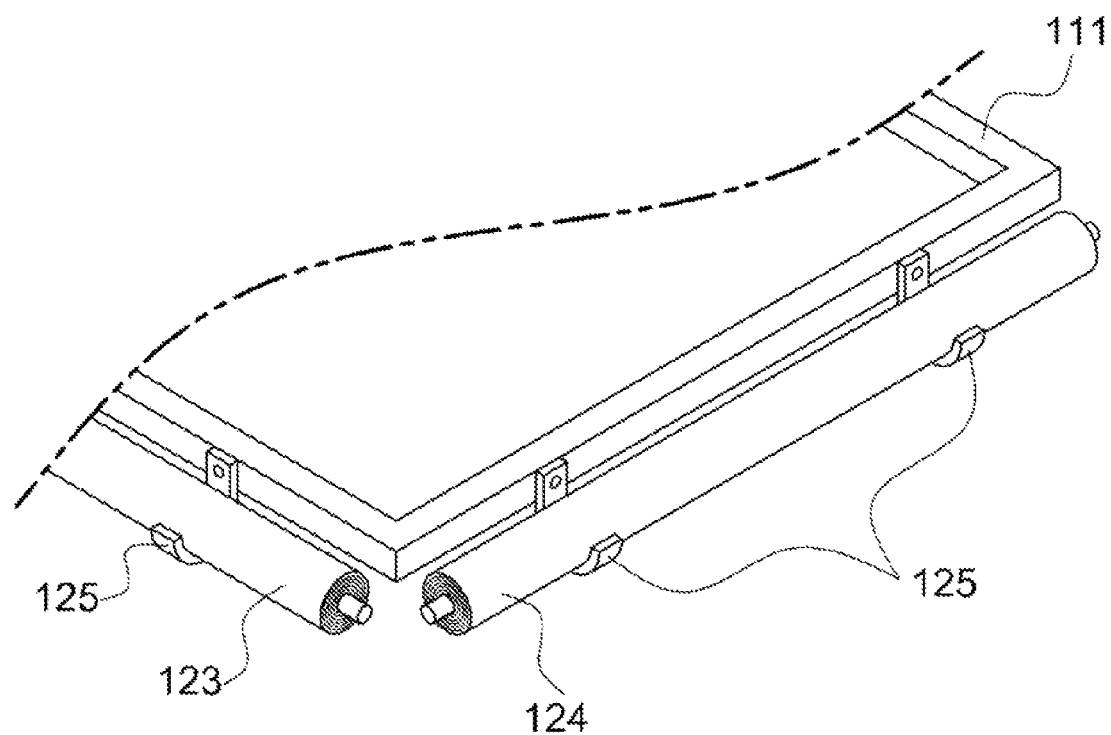
FIG. 5 is a perspective view showing a condition in which awning screens applied to the folding type awning board for the electrically driven scooter according to the present invention are wound.

The ceiling awning screen 121 can usually be in closed condition, however, the left and right awning screens 122, 123 and the rear awning screen 124 can be preserved while in condition of being wound (or folded) on the ceiling awning screen 121 as shown in FIG. 5 for ventilation. To this end, a fixing band 125 is provided at the ceiling awning screen 121 to preserve the left and right awning screens 122, 123 and the rear awning screen 124 in a wound condition. The fixing band 125 is for example formed in U shape section and is fixed to the ceiling frame 111 so that the left and right awning screens 122, 123 and the rear awning screen 124 do not escape out.

The left and right awning screens 122, 123 and the rear awning screen 124 are for example combined with a round pipe at their lower end portions so as to be rapidly and tightly developed due to the weight of the round pipe, and at the time of reception, the pipe is inserted into the fixing band 125 so as to make the reception operation easy and to keep the reception condition.

The left and right awning screens 122, 123 and the rear awning screen 124 can be in an integral form, however, are only connected to the ceiling awning screen 121 but not connected to each other since it is preferable to open only a portion and screen the remaining portion according to the weather.

Figure 6A:
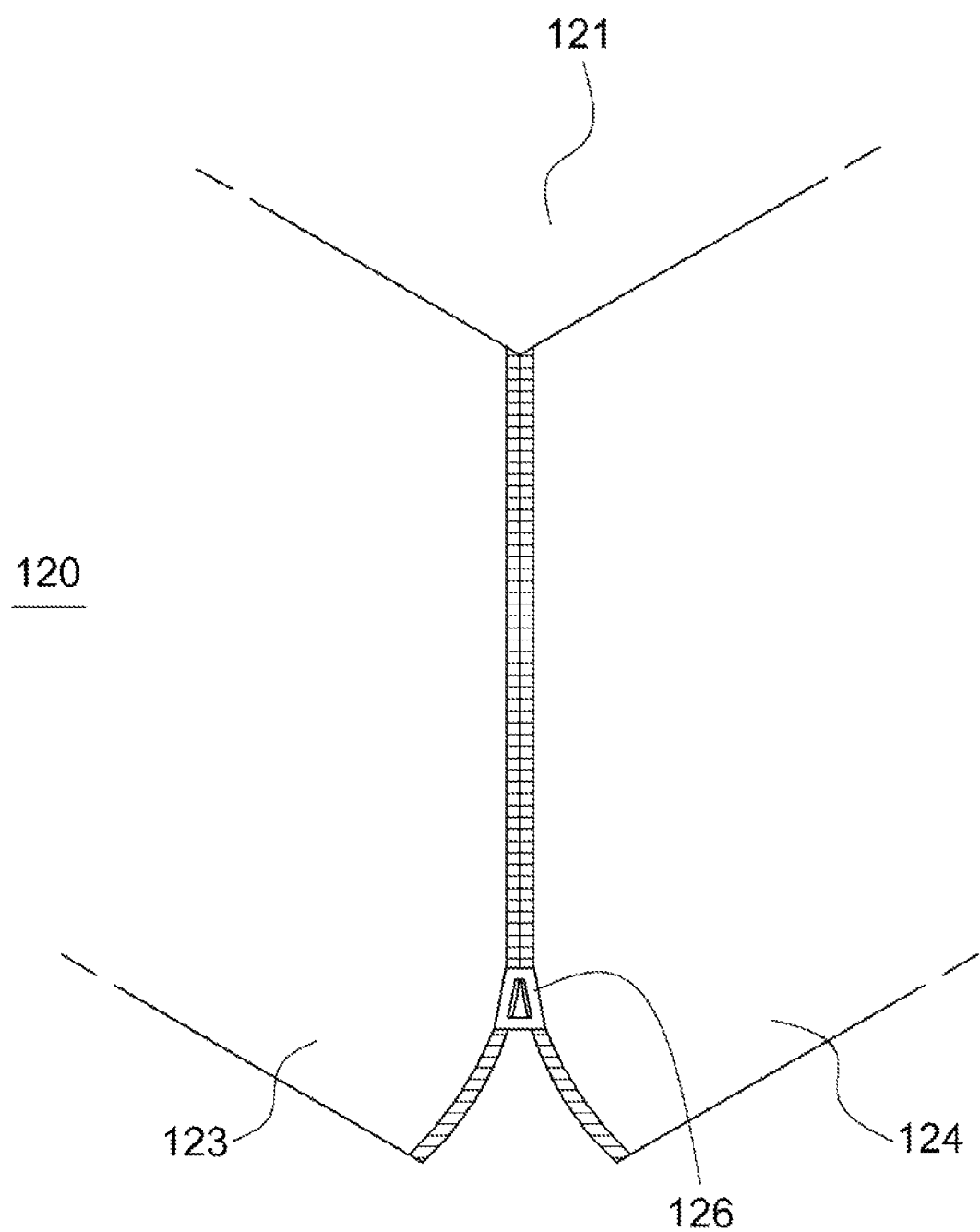
FIGS. 6a and 6b are perspective views showing a condition in which awning screens applied to the folding type awning board for the electrically driven scooter according to the present invention are attached, respectively.
Figure 6B:
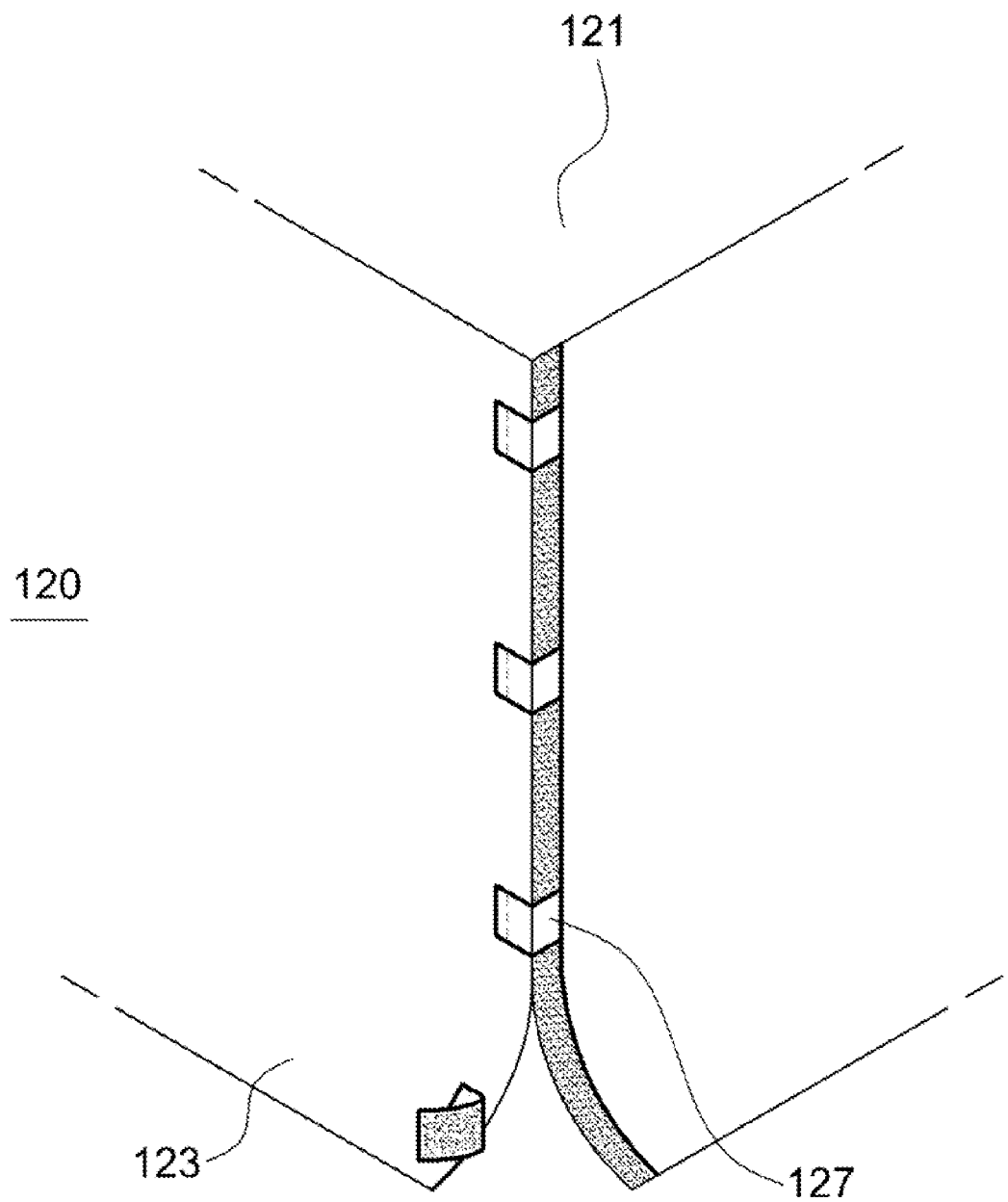
Figure 7:
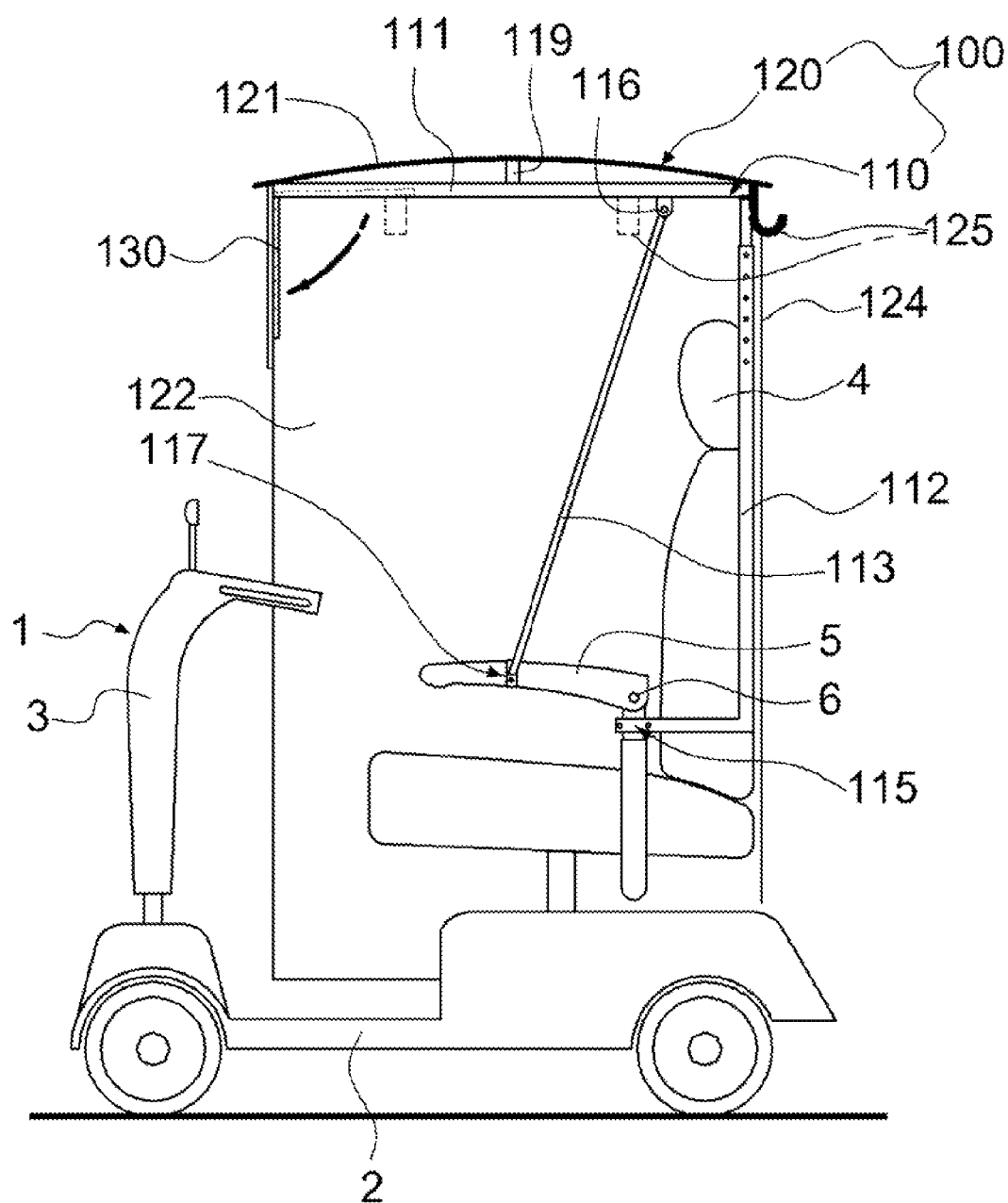
FIG. 7 is a side view in which the awning board is applied to the folding type awning board for the electrically driven scooter according to the present invention.

At this time, to be able to fix between the left and right awning screens 122, 123 and the rear awning screen 124, the left and right awning screens 122, 123 are connected to the rear awning screen 124 by means of zippers 126 (FIG. 6*a*) or hook-and-loop (VELCRO) fasteners 127 (FIG. 6*b*).

The awning screen 120 can be provided with a front awning screen, and the front awning screen is, if not used, can be preserved at the ceiling awning screen 121 in the wound condition as other awning screens 122, 123, 124, and in addition, the connection portion between the front awning screen and the left and right awning screens 122, 123 can be closed by means of the zippers, the hook-and-loop fasteners and the like.

The front awning screen, the left and right awning screens 122, 123 and the rear awning screen 124 are preferably transparent to secure the sight, and the ceiling awning screen 121 is preferably opaque to intercept the sunlight.

The awning board 100 of the present invention can be applied with a sun visor 130 instead of the front awning screen. The sun visor 130 is foldably combined to the ceiling frame 111, so that when not in use it is preserved in a condition of being attached to the ceiling frame 111 and when in use it is developed from the ceiling frame 111 to intercept the sunlight.

Figure 8:
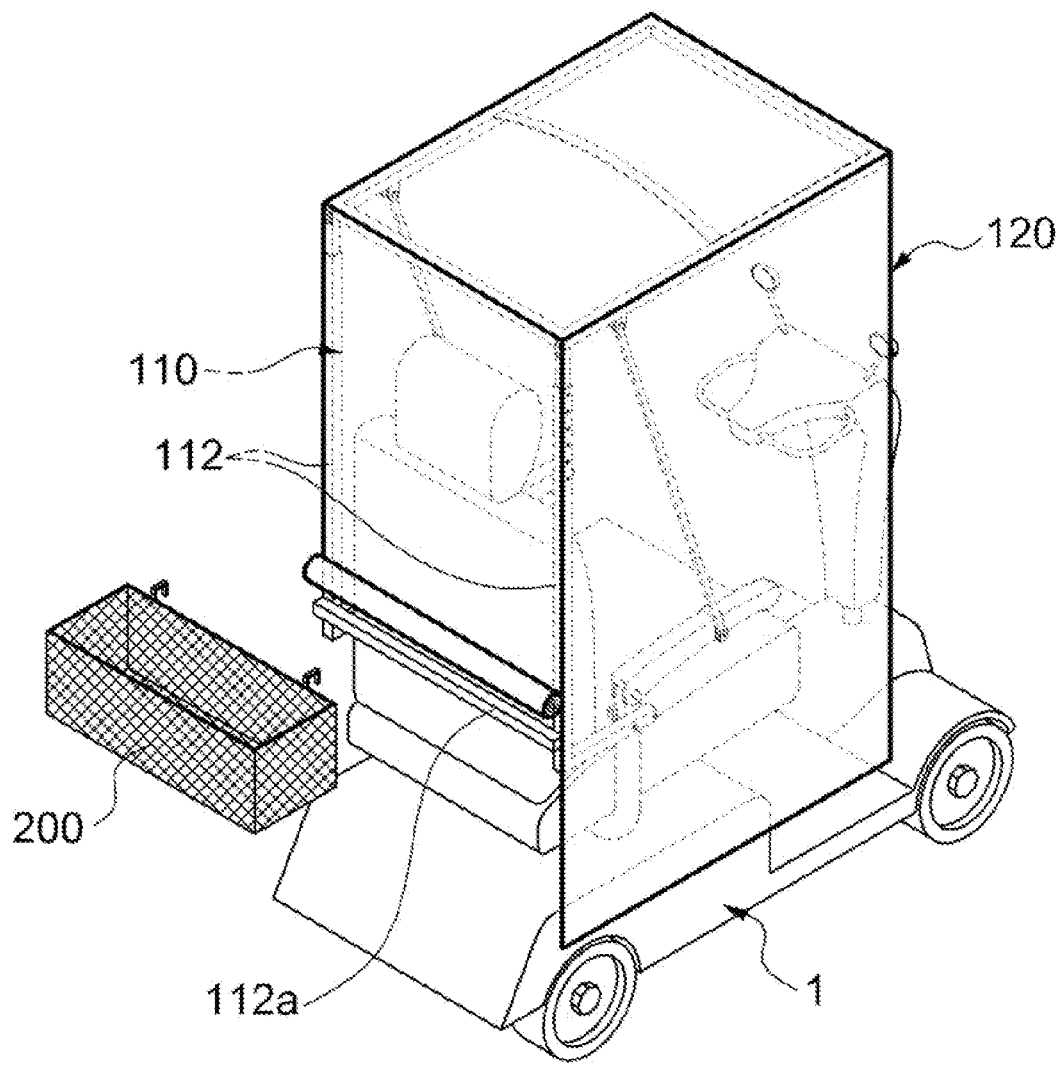
FIG. 8 is a rear view in which the a receiving section is applied to the folding type awning board for the electrically driven scooter according to the present invention

The awning board 100 of the present invention can intercept the sunlight as well as provide a reception space for receiving articles, and is provided with a reception section 112*a* for receiving a reception net 200 as shown in FIG. 8. The reception section 112*a* is formed transversely between the first and second seat fixing rods 112 and is connected to the first and second seat fixing rods 112, and a hook 210 of the reception net 200 is hooked to the reception section 112*a* so that the reception net 200 is received. The reception section 112*a* is not limited to the structure described above, but also is possible to have a bucket structure able to receive articles instead of using a separate reception net.

The action of the folding type awning board for an electrically driven scooter according to the present invention is as follows:

At the time of installation of the awning board 100 of the present invention, as described above, the first and second armrest fixing rods 113 are fixed to the armrest 5 through the armrest fixing means 117, and the first and second seat fixing rods 112 are fixed to the armrest support rods 6 through the seat fixing means 115, so that the awning board 100 is mounted on the electrically driven scooter 1.

FIG. 3 shows a condition of travelling and not in use, where since the awning board 100 is laid down toward the electrically driven scooter 1 and the awning screen 120 shelters the user, the direct rays are not irradiated to the user on the seat 4 and the rain and the snow do not adhere to the user.

Meanwhile, the user has to raise the armrest 5 to get on the electrically driven scooter 1, that is, since the armrest 5 is positioned between the user and the seat 4, the user has to raise the armrest 5 to sit on the seat 4 conveniently. At this time, in the awning board 100 of the present invention, the first and second armrest fixing rods 113 are rotated about the shaft pins 116 and the ceiling frame 111 is rotated about the hinge 114, so that the ceiling frame 111 and the first and second armrest fixing rods 113 are erected and folded while maintaining the first and second seat fixing rods 112 erected.

Therefore, by the seat 4 are there no structures which obstruct the user from sitting on the seat 4, so that the user may sit on the seat 4 conveniently. At this time, since the ceiling section of the awning board 100 of the present invention is erected, the user sits conveniently without having to bow his body as if there is no awning board 100.

If, after sitting on the seat 4, at least one armrest 5 or the ceiling frame 111 is pulled down, then the armrest 5 is laid down and accordingly the ceiling frame 111 and the first and second armrest fixing rods 113 are laid down.

During riding the electrically driven scooter 1 and travelling, the direct rays are not irradiated to the user by means of the awning screen 120 and the rain, snow and dirt are interrupted by means of the awning screen 120, so that the user travel while maintaining the comfort.

Meanwhile, in case of getting off the electrically driven scooter 1, if either armrest 5 or the ceiling frame 111 is raised, then the armrest 5 and the awning board 100 are erected as described above, so that a wide space is provided adjacent the seat 4 and the user get off conveniently through this space. After getting off, the armrest 5 and the awning board 100 are preserved by being laid down.

What is claimed is:

1. A folding type awning board for an electrically driven scooter applied to the electrically driven scooter in which both side armrests are folded, comprising:
    a frame fixed to said electrically driven scooter; and
    an awning screen installed at at least one of the front, rear, left, right sides and a ceiling of said frame;
    wherein said frame comprises:
    a ceiling frame in the form of a square frame;
    a seat fixing section which is arranged at the rear side of said ceiling frame toward the lower side, which is hinge combined to said ceiling frame, and which is fixed to said electrically driven scooter; and
    first and second armrest fixing rods, the upper end portions of which are hinge connected to said ceiling frame at a portion of said ceiling frame in the front of said seat fixing section, and the lower end portions of which are separably connected to said armrests of said electrically driven scooter,
    whereby when said armrests of said electrically driven scooter are folded, said first and second armrest fixing rods and said ceiling frame are folded together so as to be erected or laid down,
    said seat fixing section is first and second seat fixing rods, the upper end portions of which are on the one hand each connected to both of left and right sides at the rear side of said ceiling frame with a hinge so as to be foldable, and the lower end portions of which are, through fixing means, separably fixed to armrest support rods formed to support said armrests to said electrically driven scooter, said first and second seat fixing rods and said first and second armrest fixing rods are each composed by expandibly connecting two pipes composed of sizes different from each other, whereby the height of said awning board is adjusted to the height of the user.

2. The folding type awning board for an electrically driven scooter of claim 1, wherein said seat fixing means comprises a first fixing block which wraps the outside of said armrest support rods formed to support said armrests to said electrically driven scooter, a second fixing block which wraps the inner side of said armrest support rods at the side opposed to said first fixing block, and screw tools which are screwed to said first and second fixing blocks and make said first and second fixing blocks fixed while wrapping said armrest support rods.

3. The folding type awning board for an electrically driven scooter of claim 2, further comprising a sun visor foldably mounted at the front side of said ceiling frame so as to be able to adjust the angle.

4. The folding type awning board for an electrically driven scooter of claim 2, wherein said awning screen comprises a ceiling awning screen which is raised on the top of said ceiling frame, and left and right awning screens and rear awning screen which are installed at the left, right and rear sides, respectively, said left and right awning screens and said rear awning screen are connected to said ceiling screen at their upper end portions, and after being wound in the form of a roll toward said ceiling frame, either are fixed to said ceiling screen through a fixing band or are used by being developed.

5. The folding type awning board for an electrically driven scooter of claim 1, wherein said first and second armrest fixing rods are fixed to said armrests through fixing brackets which wrap a part of said armrest, and at least one elastic members which together with said fixing brackets fix said armrest by wrapping it.

6. The folding type awning board for an electrically driven scooter of claim 5, wherein said seat fixing means comprises a first fixing block which wraps the outside of said armrest support rods formed to support said armrests to said electrically driven scooter, a second fixing block which wraps the inner side of said armrest support rods at the side opposed to said first fixing block and screw tools which are screwed to said first and second fixing blocks and make said first and second fixing blocks fixed while wrapping said armrest support rods.

7. The folding type awning board for an electrically driven scooter of claim 5, further comprising a sun visor foldably mounted at the front side of said ceiling frame so as to be able to adjust the angle.

8. The folding type awning board for an electrically driven scooter of claim 5, wherein said awning screen comprises a ceiling awning screen which is raised on the top of said ceiling frame, and left and right awning screens and rear awning screen which are installed at the left, right and rear sides, respectively, said left and right awning screens and said rear awning screen are connected to said ceiling screen at their upper end portions, and after being wound in the form of a roll toward said ceiling frame, either are fixed to said ceiling screen through a fixing band or are used by being developed.

* * * * *